(12) United States Patent
Noborio et al.

(10) Patent No.: US 7,789,059 B2
(45) Date of Patent: Sep. 7, 2010

(54) INTAKE CONTROL DEVICE AND STRADDLE-TYPE VEHICLE WITH INTAKE CONTROL DEVICE

(75) Inventors: Daichi Noborio, Iwata (JP); Hidenori Akatsuka, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 696 days.

(21) Appl. No.: 11/780,756

(22) Filed: Jul. 20, 2007

(65) Prior Publication Data

US 2008/0017166 A1  Jan. 24, 2008

(30) Foreign Application Priority Data

Jul. 20, 2006 (JP) .............................. 2006-197883
Sep. 20, 2006 (JP) .............................. 2006-255049

(51) Int. Cl.
F02M 35/10 (2006.01)
(52) U.S. Cl. .............................. 123/184.55; 123/184.53

(58) Field of Classification Search ............ 123/184.53, 123/184.55
See application file for complete search history.

(56) References Cited

FOREIGN PATENT DOCUMENTS

JP  09-184423  7/1997

*Primary Examiner*—Noah Kamen
(74) *Attorney, Agent, or Firm*—Keating & Bennett, LLP

(57) ABSTRACT

An intake control device for an air intake system includes one or more stationary intake pipes that communicate with one or more intake ports of an engine. One or more movable intake pipes are movable relative to the stationary intake pipes and, in one position, cooperate with the stationary intake pipes to define engine air intake passages. An actuator applies a force tending to move the movable intake pipes in a first direction. A controller controls the actuator. The movable intake pipes are inhibited from moving beyond a first position in the first direction. The controller directs the actuator to apply a force to the movable intake pipes when the movable intake pipes are in the first position.

19 Claims, 14 Drawing Sheets

| ENGINE ROTATING SPEED (rpm) | 1000 | 2000 | · · · | · · · | 10000 | 12000 |
|---|---|---|---|---|---|---|
| COUPLING ENERGIZING STOPPAGE TIME (sec) | 5 | 4.5 | · · · | · · · | 0.75 | 0.5 |

*Figure 11*

| ENGINE ROTATING SPEED (rpm) | 1000 | 2000 | ... | ... | 10000 | 12000 |
|---|---|---|---|---|---|---|
| SEPARATION ENERGIZING STOPPAGE TIME (sec) | 10 | 9 | ... | ... | 2 | 1 |

*Figure 12*

INTAKE CONTROL DEVICE AND STRADDLE-TYPE VEHICLE WITH INTAKE CONTROL DEVICE

RELATED APPLICATIONS

This application is related to, and claims priority from, Japanese Patent Application Nos. 2006-255049, filed Sep. 20, 2006, and 2006-197883, filed Jul. 20, 2006, the entireties of which are hereby incorporated by reference herein and made a part of the present specification.

BACKGROUND OF THE INVENTION

1. Field of the Invention

The present invention relates to a variable length intake control device, which varies a length of an intake passage of an engine. The present invention also relates to a straddle-type vehicle incorporating such an intake control device.

2. Description of the Related Art

Conventionally, an intake control device is known, which varies a length of an engine air intake passage of an engine to change an intake efficiency to change an output characteristic of the engine. For example, when the engine speed is low, the intake control device lengthens an intake pipe length to increase the torque output of the engine at lower engine speeds. In contrast, when the engine speed is high, the intake pipe length is shortened to increase the torque output of the engine at higher engine speeds.

Some intake control devices include a movable intake pipe that is moved between a coupled position, in which it is coupled to a stationary intake pipe coupled to an intake port of an engine, and a separated position, in which it is separated from the stationary intake pipe, by a driving force of an actuator (see, for example, Japanese Patent Publication No. 09-184423). Such intake control devices comprise a potentiometer for detection of a position of the movable intake pipe. The control device detects positional deviation of the moving intake pipe on the basis of a detected value of the potentiometer to correct a position of the moving intake pipe.

SUMMARY OF THE INVENTION

An aspect of the present invention involves the realization by the present inventors that, because the conventional intake control device controls the actuator on the basis of a detected value of the potentiometer, the resulting processing for controlling the actuator is rather complex. In addition, the position of the movable intake pipe may be affected by outside forces, such as vibrations due to operation of the associated vehicle.

A preferred embodiment of the present invention involves an intake control device capable of accurately controlling a variable length intake passage with a relatively simple control process. In one arrangement, the intake control device moves a movable intake pipe for a period of time, rather than based on feedback from a position sensor. In addition, once the movable intake pipe is in a desired position, the control device may apply a force to the movable intake pipe to ensure the intake pipe remains in the desired position. A preferred embodiment of the present invention also involves a straddle-type vehicle incorporating such a control device.

In one embodiment, an intake air control device includes a stationary intake pipe that at least partially defines an intake passage the communicates with an intake port of an engine. A movable intake pipe is movable relative to the stationary intake pipe to vary a length of the intake passage. An actuator is capable of moving the movable intake pipe. A controller controls the actuator. The movable intake pipe is inhibited from moving beyond a first position relative to the stationary intake pipe in a first direction. The controller directs the actuator to apply a force tending to move the movable intake pipe in the first direction when the movable intake pipe is in the first position.

One preferred embodiment involves a straddle-type vehicle that incorporates an intake control device as described above. The straddle-type vehicle may be, for example, a motorcycle (including a scooter), four-wheeled buggy, snowmobile, all-terrain vehicle (ATV), and the like.

An aspect of a preferred embodiment involves an intake control device as described above in which the first position is a coupled position. In the coupled position, the movable intake pipe is coupled to the stationary intake pipe. Accordingly, it is possible to control the actuator with a simple control process to prevent positional deviation of the movable intake pipe when the movable intake pipe is desired to be in the coupled position. Also, a stop may be provided that inhibits the movable intake pipe from moving beyond the coupled position.

Another aspect of a preferred embodiment involves an intake control device as described above in which the set position is a separated position. In the separated position, the movable intake pipe is separated from the stationary intake pipe. With such an arrangement, it is possible to control the actuator with a relatively simple control process to prevent positional deviation of the movable intake pipe. In addition, a stop may be provided that inhibits the movable intake pipe from moving beyond the separated position.

Yet another aspect of a preferred embodiment involves an intake control device as described above in which the force applied to the movable intake pipe by the actuator when the movable intake pipe is moving toward the first position is of a first magnitude and the force applied to the movable intake pipe by the actuator when the movable intake pipe is in the first position is of a second magnitude. The second magnitude is smaller than the first magnitude. Accordingly, it is possible to efficiently drive the actuator when the movable intake pipe is in the first position.

Still another aspect of a preferred embodiment involves an intake control device as described above in which the controller drives the actuator so that a force applied to the movable intake pipe in the first position is intermittent. As a result, it is possible to efficiently drive the actuator when the movable intake pipe is in the first position. Also, a vehicle condition sensor that detects an operating condition of a vehicle associated with the control device may be provided. The controller directs the actuator to apply the force to the movable intake pipe at a time interval that is dependent on the operating condition of the vehicle. Thereby, it is possible to appropriately drive the actuator according to an operating condition of the vehicle to further stably maintain the movable intake pipe in the first position.

Another aspect of a preferred embodiment involves an intake control device as described above in which the movable intake pipe is movable in a coupling direction, in which it approaches the stationary intake pipe, and in a separation direction, in which it separates from the stationary intake pipe. The controller drives the actuator so that the movable intake pipe is moved in the separation direction when an operation of the intake control device is terminated. Accordingly, the movable intake pipe is separated from the stationary intake pipe when an operation of the intake control device is terminated so that the durability of the intake control device is improved.

Still another aspect of a preferred embodiment involves an intake control device as described above in which the movable intake pipe may be movable between a coupled position, in which it is coupled to the stationary intake pipe, and a separated position, in which it is separated from the stationary intake pipe, and the controller may drive the actuator so that the movable intake pipe is arranged between the coupled position and the separated position when an operation of the intake control device is terminated.

BRIEF DESCRIPTION OF THE DRAWINGS

These and other features, aspects and advantages of the present invention are described with reference to drawings of preferred embodiments, which are intended to illustrated but not to limit the present invention. The drawings contain fourteen (14) figures.

In FIG. 4, the movable intake pipes are separated from the stationary intake pipes.

In FIG. 5, the movable intake pipes are coupled to the stationary intake pipes.

In FIG. 7a, the moving member is moving in a first direction and, in FIG. 7b, the moving member is moving in a second direction.

FIG. 11 is a table of a preferred coupling energizing stoppage time for various engine speeds.

FIG. 12 is a table of a preferred separation energizing stoppage time for various engine speeds.

DETAILED DESCRIPTION OF THE PREFERRED EMBODIMENTS

Figure 1:
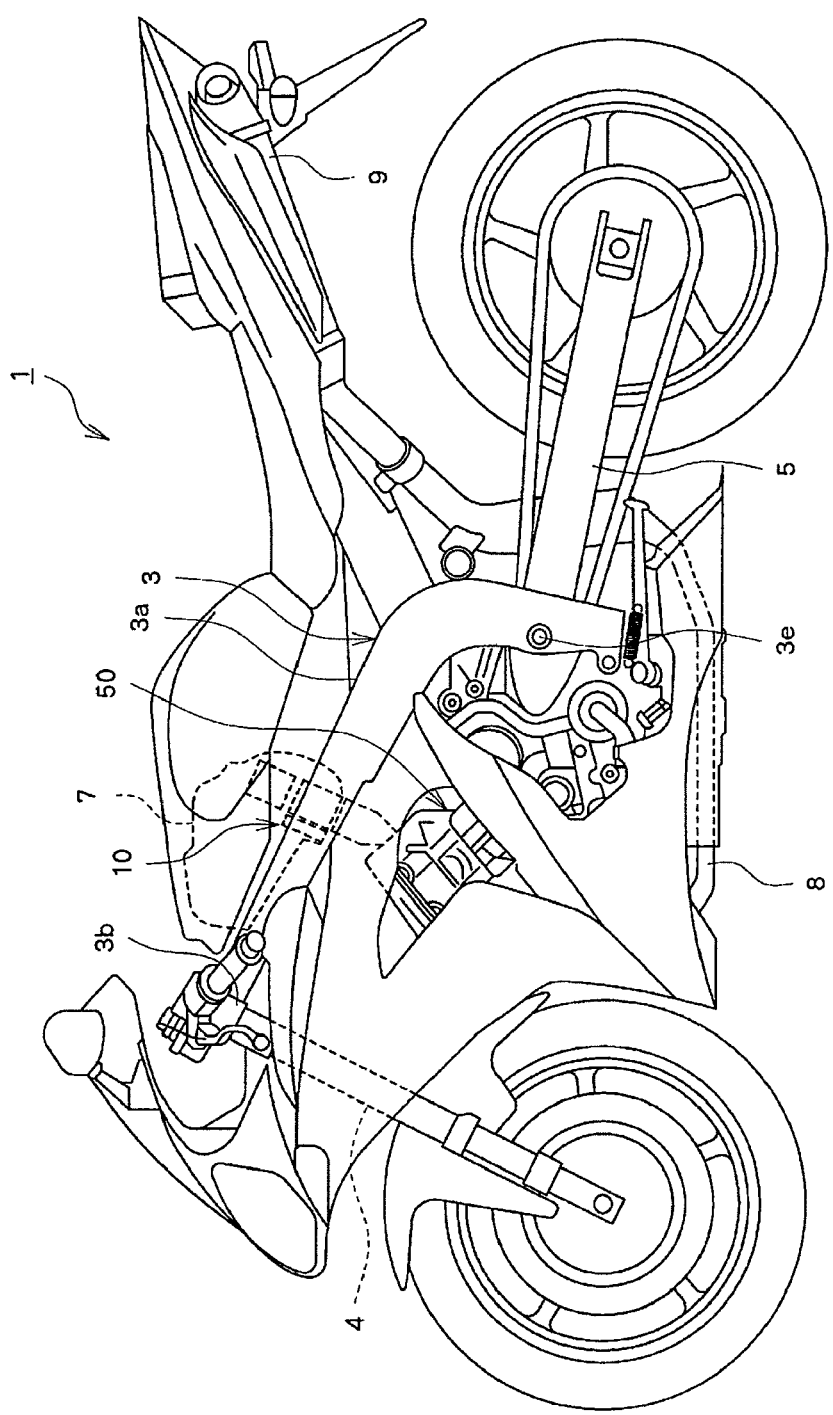
FIG. 1 is a side view of a motorcycle incorporating an intake control device having certain features, aspects and advantages of the present invention.
Figure 2:
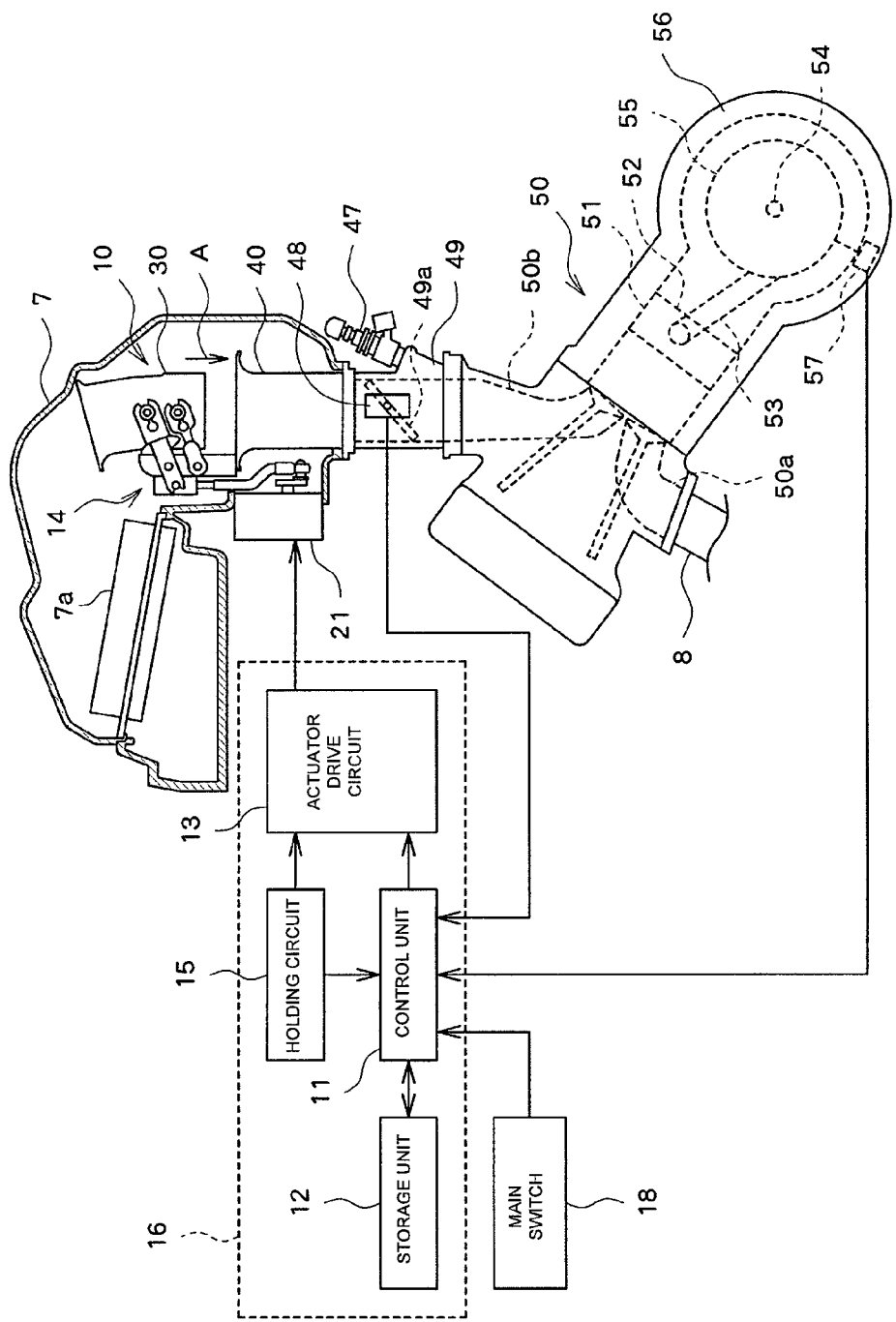
FIG. 2 is a partial schematic, side view of the engine and intake control device of FIG. 1. The intake control device includes an intake pipe length varying mechanism.

Preferred embodiments of the invention are described below with reference to the drawings. FIG. 1 is a side view of a motorcycle 1 provided with an intake control device 10 having certain features, aspects and advantages of the present invention. FIG. 2 illustrates a preferred construction of an engine 50 and the intake control device 10.

As shown in FIG. 1, the motorcycle 1 includes, among other components and systems, a body frame 3, the intake control device 10, and the engine 50. Also, as shown in FIG. 2, the intake control device 10 includes a control unit 11, a storage unit 12, an actuator drive circuit 13, an intake pipe length varying mechanism 14, and a holding circuit 15.

As shown in FIG. 1, the body frame 3 includes a main frame 3a and a steering head portion 3b is provided on a front end of the main frame 3a to rotatably support a steering shaft (not shown). A front suspension fork 4 is coupled to the steering shaft and, thus, is also rotatable with respect to the steering head portion 3b. The main frame 3a extends obliquely downward toward the rear of a vehicle body from the steering head portion 3b. A rear swing arm 5 is mounted to a rear end of the main frame 3a to be able to swing vertically about a pivot shaft 3e.

The engine 50 is arranged below the main frame 3a. As shown in FIG. 2, the engine 50 is formed with exhaust ports 50a that communicate with combustion chambers of the engine 50. Exhaust pipes 8 are coupled to the exhaust ports 50a. Rear ends of the exhaust pipes 8 open into a muffler 9 (FIG. 1), which reduces a sound level of exhaust gases that are discharged to the atmosphere. Also, intake ports 50b communicate with the combustion chambers of the engine 50. Throttle bodies 49 are coupled to the intake ports 50b. Fuel delivery devices, such as fuel injectors 47, are mounted to the throttle bodies 49 to deliver fuel into intake passages of the throttle bodies 49. Also, air intake control valves control an amount of intake air deliver to the combustion chambers. In the illustrated arrangement, throttle valves 49a are arranged in the intake passages of the throttle bodies 49. Throttle position sensors 48 are mounted to sides of the throttle bodies 49 to detect throttle opening positions. The throttle position sensors 48 output to the control unit 11 voltage signals that correspond to throttle opening position (in units of angular degrees, for example) as throttle opening signals. Although the illustrated arrangement is preferred, other suitable exhaust, intake and fuel delivery control systems may be employed.

An air cleaner 7, including an air cleaner box or housing that defines an air cleaner chamber, is arranged above the engine 50. Intake air is filtered by a filter 7a of the air cleaner 7 prior to flowing into the throttle bodies 49. In addition, movable intake pipes 30 and stationary intake pipes 40, which are described hereinafter, are accommodated in the air cleaner 7. An air introduced into the air cleaner 7 passes through the stationary intake pipes 40, or through both the stationary intake pipes 40 and the movable intake pipes 30, and then flows into the throttle bodies 49. Also, an air duct (not shown) is coupled to the air cleaner 7 and intake air enters the air cleaner 7 through the air duct.

Pistons 52 are accommodated in cylinders 51 of the engine 50. Upper ends of coupling rods 53 are mounted to the pistons 52 and lower ends thereof are mounted to a crank shaft 54. A fly wheel 55 is mounted to the crank shaft 54. A plurality of projections (not shown) aligned at equal intervals in a circumferential direction are formed on an outer peripheral surface of the fly wheel 55. A crank angle sensor 57 is mounted to a crank case 56 to face the outer peripheral surface of the fly wheel 55. Whenever the projections of the fly wheel 55 passes the crank angle sensor 57, the crank angle sensor 57 outputs to the control unit 11 a signal (referred below to as crank angle signal). The control unit 11 detects the rotating speed of the engine 50 on the basis of the frequency at which the crank angle signals are received. In addition, a description is given herein assuming that the engine 50 is a four-cylinder engine and four cylinders 51 are aligned in a vehicle width direction. However, other suitable engine configurations are possible, such as other numbers of cylinders, for example. In addition, the illustrated engine 50 is a four-cycle engine, but engines operating on other engine principals (e.g., two-cycle crankcase compression) may also be used.

As described above, the intake control device 10 includes the control unit 11, the storage unit (or memory) 12, the actuator drive circuit 13, the intake pipe length varying mechanism 14, and the holding circuit 15. The intake pipe length varying mechanism 14 includes the movable intake pipes 30, an actuator 21 that displaces the movable intake pipes 30, and stationary intake pipes 40. In addition, the control unit 11, the storage unit 12, the actuator drive circuit 13, and the holding circuit 15 are mounted as an engine control unit 16 on a vehicle body.

The control unit 11 includes a CPU (Central Processing Unit) to control various electrical equipment mounted on the vehicle body according to a program stored in the storage unit 12. According to the embodiment, a control process is performed, in which an intake pipe length is varied by driving the actuator 21 to displace the movable intake pipes 30 according to an operating state such as the rotating speed of the engine 50, a throttle manipulation made by a passenger, etc. A preferred control process executed by the control unit 11 is described below.

The storage unit 12 comprises a nonvolatile memory to preserve a program being executed by the control unit 11. The actuator drive circuit 13 supplies the actuator 21 with electric power, which corresponds to a signal input from the control unit 11. The holding circuit 15 supplies the control unit 11 and the actuator drive circuit 13 with electric power of a battery (not shown) for a predetermined period of time after a main switch 18 is moved to OFF.

The movable intake pipes 30 move relative to the stationary intake pipes 40 between a coupled position, in which they are coupled to the stationary intake pipes 40, and a separated position separated from the coupled position to vary an intake pipe length. Preferably, the coupled position and the separated position are preset positions that correspond to a desired intake pipe length, such that in the event that the movable intake pipes 30 are in the coupled position, the intake pipe length is relatively lengthened and in the event that the movable intake pipes 30 are in the separated position, the intake pipe length is relatively shortened. The term "pipe" is intended to construed in accordance with its ordinary meaning, and includes a variety of constructions that at least partially define a passage through which a substance, such as engine intake air, may be directed. In the illustrated arrangement, the pipes are generally funnel-like in shape.

The illustrated actuator 21 includes a DC motor and is driven by DC power fed from the actuator drive circuit 13 to move the movable intake pipes 30 in a coupling direction or in a direction tending to move the movable intake pipes 30 toward the coupled position from the separated position (a direction denoted by A in FIG. 2), or in a separation direction toward the separated position from the coupled position (opposite of direction A).

Figure 3:
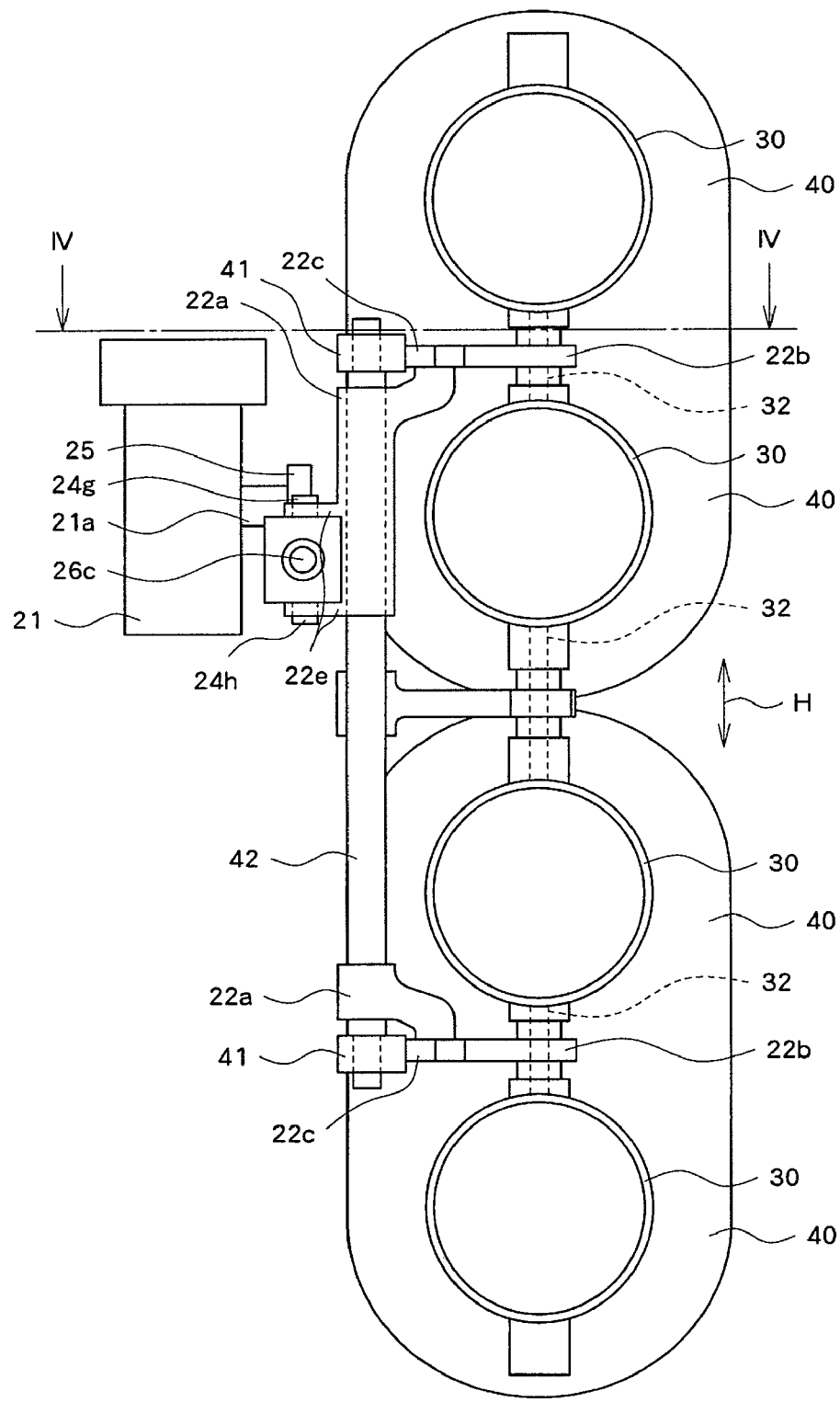
FIG. 3 is a plan view of the intake pipe length varying mechanism of FIG. 2.
Figure 4:
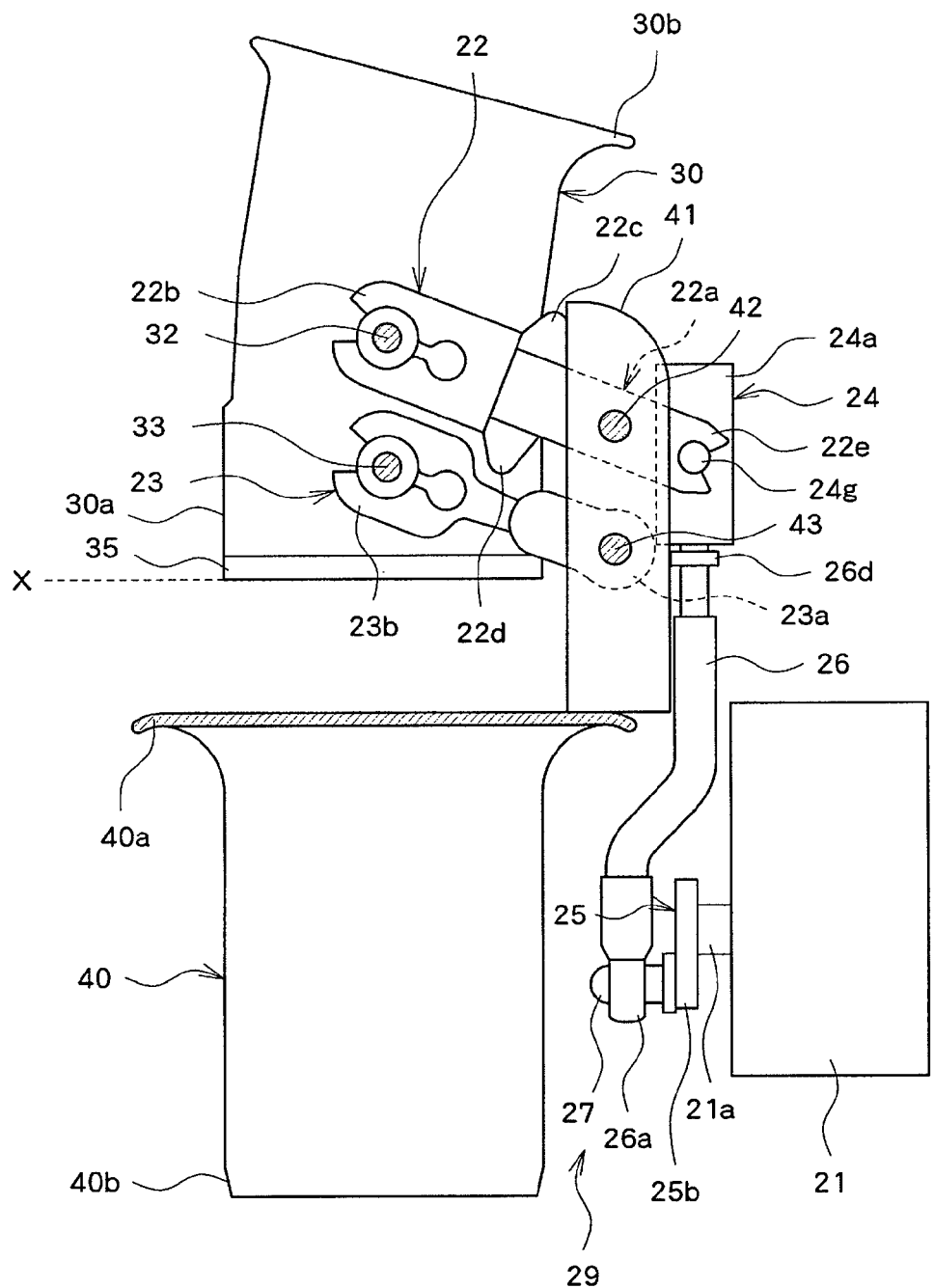
FIG. 4 is a cross sectional view of the intake pipe length varying mechanism taken along the line IV-IV in FIG. 3. The intake pipe length varying mechanism includes movable intake pipes that are movable relative to stationary intake pipes.
Figure 5:
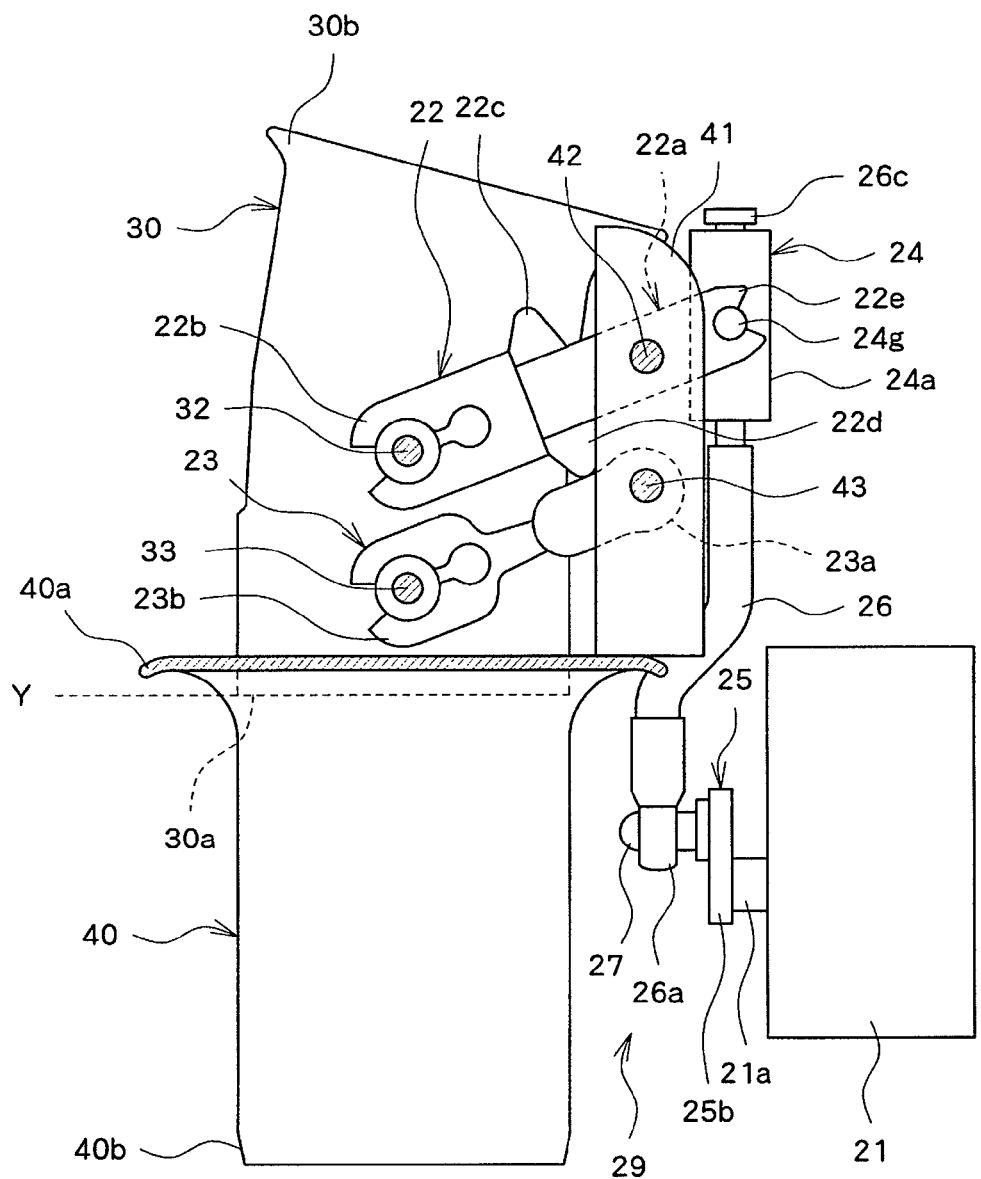
FIG. 5 is a cross sectional view taken along the line IV-IV in FIG. 3.
Figure 6:
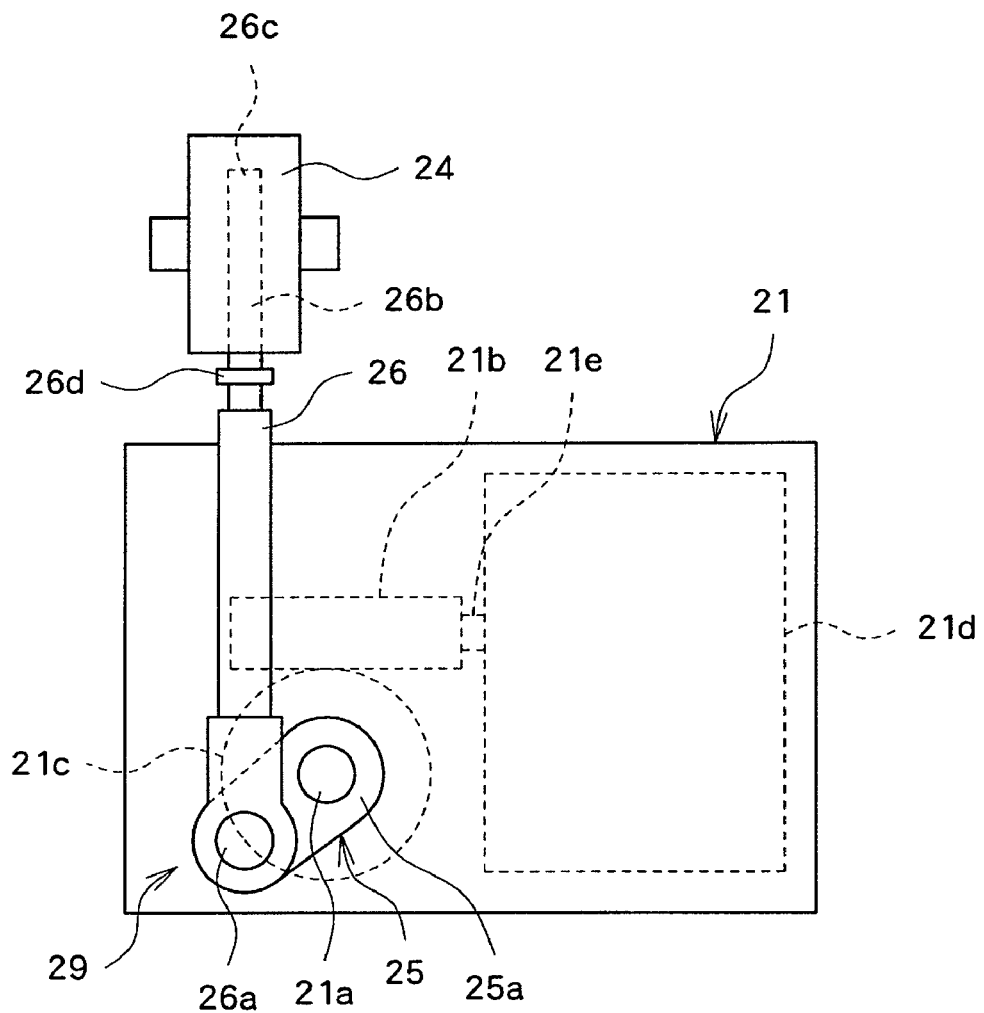
FIG. 6 is a front view of an actuator that moves the movable intake pipes between the separated position of FIG. 4 and the coupled position of FIG. 5.

A description of a preferred construction of the intake pipe length varying mechanism 14 is provided below. FIG. 3 is a plan view of the intake pipe length varying mechanism 14. FIGS. 4 and 5 are cross sectional views taken along the line IV-IV in FIG. 3, and FIG. 6 is a front view showing the actuator 21. In addition, FIG. 4 shows a state in which the movable intake pipes 30 are in a separated position X, and FIG. 5 shows a state in which the movable intake pipes 30 are in a coupled position Y.

As shown in FIG. 4, the stationary intake pipes 40 are generally cylindrical in shape and the upper ends 40a thereof are generally funnel-shaped. The lower ends 40b of the stationary intake pipes 40 are coupled to the throttle bodies 49 (see FIG. 2). Column portions 41 extend upwardly from the ends 40a of the stationary intake pipes 40 on a side of the movable intake pipes 30 adjacent the actuator 21. As described later, the column portions 41 support upper levers 22 and lower levers 23, which transmit a drive force of the actuator 21 to the movable intake pipes 30.

In addition, here, as shown in FIG. 3, four stationary intake pipes 40 and movable intake pipes 30 are arranged to be aligned in the vehicle width direction (a direction denoted by H in FIG. 3) and the respective stationary intake pipes 40 are coupled to the throttle bodies 49 provided on the respective cylinders. Also, the column portions 41 of the stationary intake pipes 40 are formed between the two adjacent stationary intake pipes 40.

The movable intake pipes 30 are generally cylindrical in shape and the lower ends 30a thereof are slightly smaller in outside diameter than funnel-shaped ends 40a of the stationary intake pipes 40. Annular sealing members (for example, rubber lips) 35, preferably having some amount of elasticity, are mounted to outer peripheries of the ends 30a. The sealing members 35 seal clearances between the ends 30a of the movable intake pipes 30 and the stationary intake pipes 40 when the movable intake pipes 30 are arranged in the coupled position Y. In addition, the upper ends 30b of the movable intake pipes 30 are generally funnel-shaped, similar to the upper ends 40a of the stationary intake pipes 40.

Upper support shafts 32 and lower support shafts 33, which are arranged parallel to each other, bridge between two adjacent movable intake pipes 30. The upper support shafts 32 are coupled for rotation relative to the upper levers 22 and the lower support shafts 33 are coupled for rotation relative to the lower levers 23.

The upper levers 22 are able to rotate vertically about an upper support shaft 42 supported by the column portions 41 and the lower levers 23 are likewise able to rotate vertically about a lower support shaft 43 supported by the column portions 41.

Specifically, the upper support shaft 42 and the lower support shaft 43, respectively, extend in the vehicle width direction and are arranged in parallel to the upper support shafts 32 and the lower support shafts 33 to bridge the two column portions 41. Intermediate portions 22a of the upper levers 22 include openings and the upper support shaft 42 is inserted through the openings. Also, bases 23a of the lower levers 23 also include openings, through which the lower support shaft 43 is inserted. Thereby, the upper levers 22 and the lower levers 23 turn about the upper support shaft 42 and the lower support shaft 43 and ends 22b, 23b, which grasp the upper support shafts 32 and the lower support shafts 33, move vertically in parallel to one another.

In addition, bases 22e of the upper levers 22 are mounted to a moving member 24, which is driven by the actuator 21 to move in a vertical direction. The moving member 24 is described in greater detail below.

Rotational driving of the actuator 21 is transmitted to the upper levers 22 through a transmission mechanism 29, which converts rotational driving movement of the actuator 21 into vertically linear driving movement to transmit the same. As shown in FIG. 6, the transmission mechanism 29 includes a vertical arm 26, a moving member 24 coupled to the arm 26 to be displaced in a vertical direction, and a coupling member 25, which converts rotational driving movement of the actuator 21 into vertical driving movement. One end 25a of the coupling member 25 (FIG. 6) is coupled to an output shaft 21a of the actuator 21 and the coupling member 25 extends radially of the output shaft 21a. The other end 25b of the coupling member 25 is coupled to a lower end 26a of the arm 26. In addition, the end 25b of the coupling member 25 and the lower end 26a of the arm 26 are coupled to each other through a coupling shaft 27, which is rotatable relative to the respective ends 25b, 26a.

With reference to FIG. 6, the actuator 21 accommodates therein a source of power, which preferably is a DC motor 21d. In addition, the actuator 21 includes a worm gear 21b, which rotates coaxially with a rotating shaft 21e of the motor 21d, and a gear 21c, which meshes with the worm gear 21b to transmit a driving force to the output shaft 21a.

Figure 7:
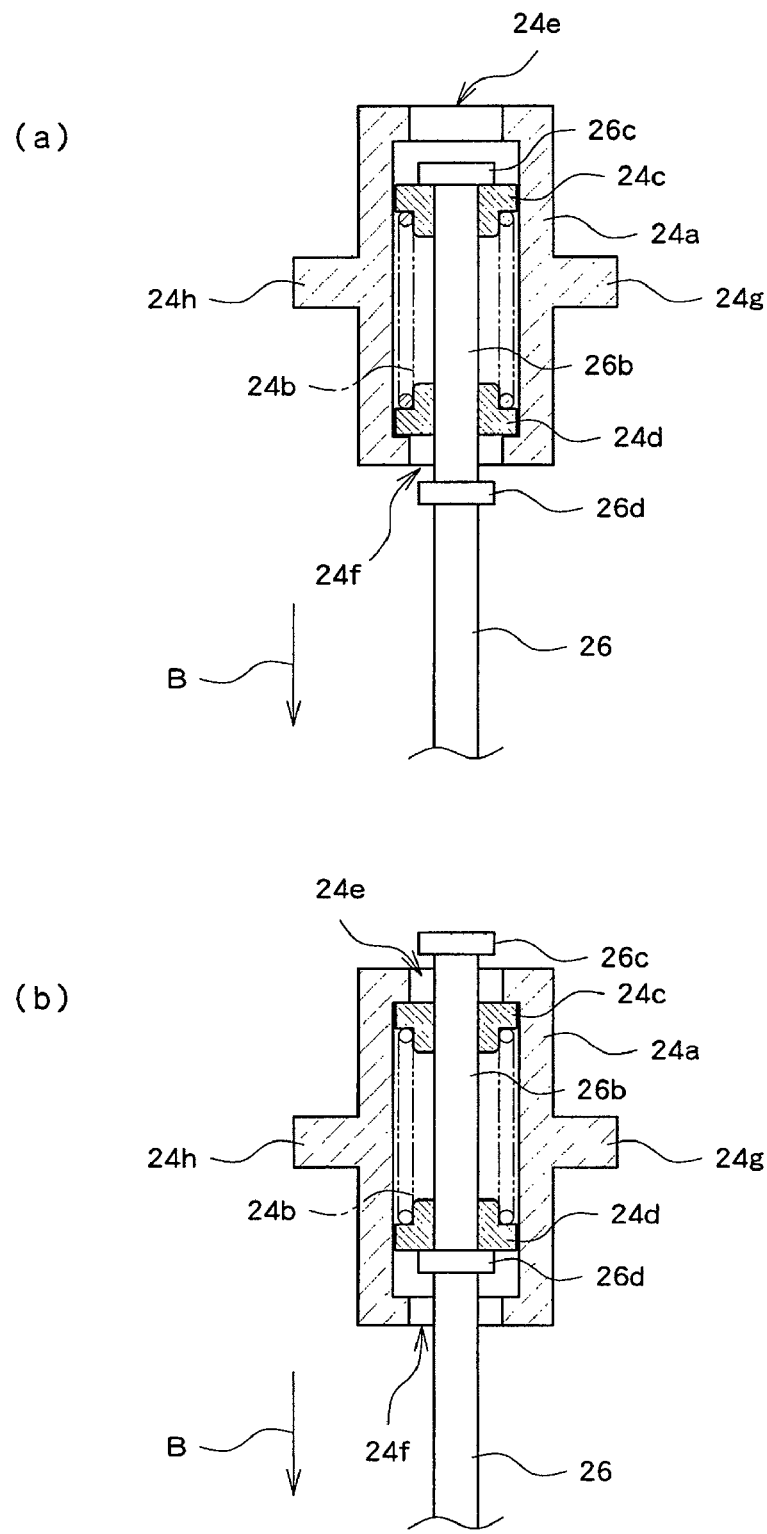
FIG. 7 is a cross sectional view of a moving member that transmits an actuation force from the actuator to the movable intake pipes.

The upper end 26b of the arm 26 is coupled to the moving member 24. FIG. 7 is a cross sectional view showing the moving member 24. FIG. 7(a) shows a state in which the arm 26 pulls the moving member 24 downward (a direction denoted by B in FIG. 7) and FIG. 7(b) shows a state in which the arm 26 pushes the moving member 24 upward (opposite the direction B).

The moving member 24 includes a box-shaped case 24a and a spring 24b, which biases the case 24a upward or downward relative to the arm 26. The arm 26 is inserted vertically into the case 24a. The spring 24b is arranged in the case 24a in a manner to surround the arm 26. Engaging members 24c, 24d contact respective ends of the spring 24b and also engage the inside of the case 24a. Engaging portions 26c, 26d are formed on the arm 26 on opposing sides of the engaging member 24c, the spring 24b, and the engaging member 24d.

When the arm 26 pulls the moving member 24 downward, the engaging portion 26c pushes the case 24a downward through the engaging member 24c, the spring 24b, and the engaging member 24d (FIG. 7(a)). On the other hand, when the arm 26 pushes the moving member 24 upward, the engaging portion 26d pushes the case 24a upward through the engaging member 24d, the spring 24b, and the engaging member 24c (FIG. 7(b)).

In addition, the case 24a is formed with openings 24e, 24f, through which the engaging portion 26c and the engaging portion 26d move into and out of the case 24a. Also, the case 24a is formed with projections 24g, 24h, which project in a lateral direction, and the base 22e of the upper lever 22 is mounted to the projections 24g, 24h (FIGS. 3 and 4).

With reference to FIG. 4, the intake pipe length varying mechanism 14 includes at least one stop, or stopper mechanism, which inhibits the movable intake pipes 30 from going beyond the coupled position Y and the separated position X. Specifically, the upper levers 22 are formed with projections 22c, which project laterally to abut against the column portions 41 when the movable intake pipes 30 are in the coupled position Y. Also, the upper levers 22 are formed with projections 22d, which project laterally to abut against the column portions 41 when the movable intake pipes 30 are in the separated position X. When the movable intake pipes 30 are present in the coupled position Y or the separated position X, the projections 22c, 22d abut against the column portions 24 to inhibit the upper levers 22 from further movement in that direction. In addition, the stopper mechanism is not limited to the arrangement described above. For example, a stopper for restriction of a rotating angle of the output shaft 21a of the actuator 21 may be formed around the output shaft 21a. Other similar or suitable arrangements may also be employed in the alternative or in addition to the arrangements described above.

The operation of the intake pipe length varying mechanism 14 is described below. When the actuator 21 pulls the arm 26 downward, the arm 26 draws the case 24a of the moving member 24 to pull the bases 22e of the upper levers 22 downward. Consequently, in one operational state, the upper levers 22 and the lower levers 23 turn about the upper support shaft 42 and the lower support shaft 43 to pull the movable intake pipes 30 upward until the projections 22c abut against the column portions 41. When the projections 22c about against the column portions 41, the movable intake pipes 30 are in the separated position X (FIG. 4).

On the other hand, when the actuator 21 pushes the arm 26 upward, the arm 26 pushes the bases 22e of the upper levers 22 upward through the case 24a. Consequently, until the projections 22d abut against the column portions 41, the upper levers 22 and the lower levers 23 turn about the upper support shaft 42 and the lower support shaft 43 to push the movable intake pipes 30 downward (see FIG. 5). At this time, the movable intake pipes 30 are arranged in the coupled position Y and the sealing members 35 abut against the ends 40a of the stationary intake pipes 40.

Figure 8:
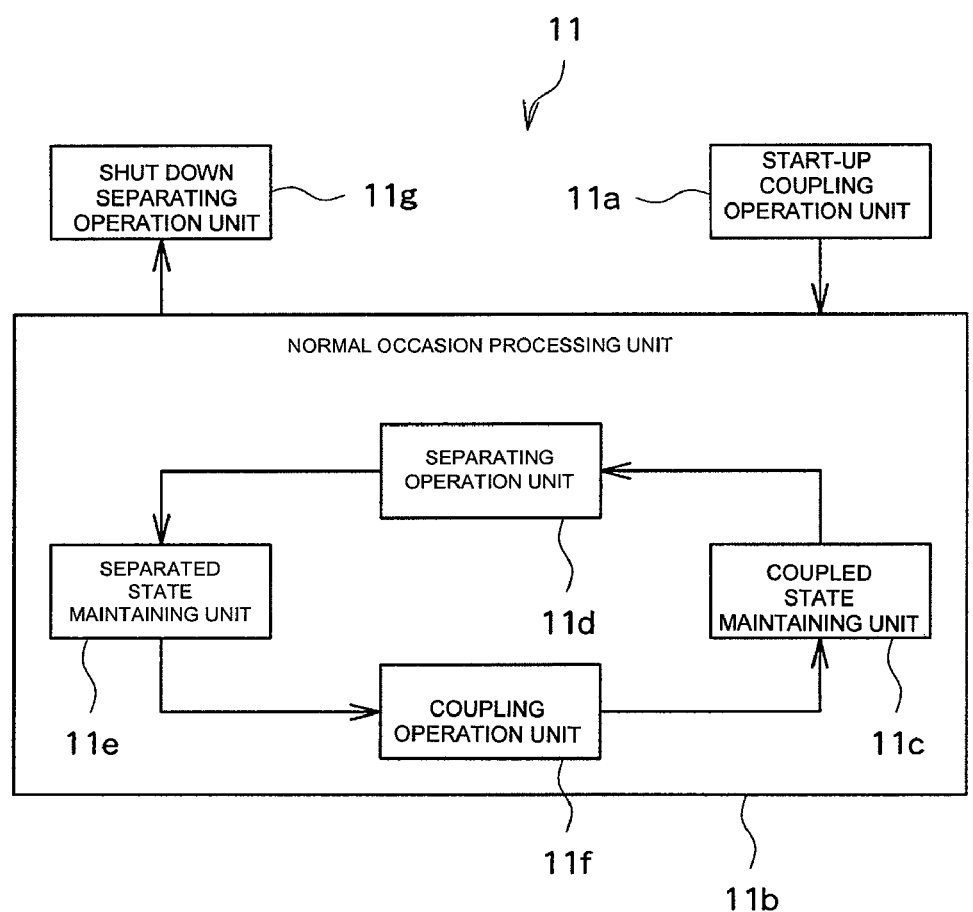
FIG. 8 is a block diagram of a control unit of the intake control device.

As described above, the control unit 11 executes a control process to drive the actuator 21 according to an operating state of a vehicle to vary an intake pipe length. FIG. 8 is a functional block diagram for one preferred control process executed by the control unit 11. As shown in FIG. 8, the control unit 11 includes start-up coupling operation unit 11a, a normal processing unit 11b, and a shutdown separating operation unit 11g. In addition, in the illustrated arrangement, the control unit 11 controls electric power supplied to the actuator 21 by the actuator drive circuit 13 (FIG. 2).

When the control unit start-up is initiated, such as when engine start-up is initiated, for example, the start-up coupling operation unit 11a drives the actuator 21 to displace the movable intake pipes 30 in the direction of coupling. For example, when the main switch 18 (which can be an ignition switch of the motorcycle 1) is moved to the ON position, the start-up coupling operation unit 11a drives the actuator 21 for a preset period of time (referred herein as the start-up coupling operation time). Here, the start-up coupling operation time is the time required for movement of the movable intake pipes 30 to the coupled position Y from a position before displacement begins. The start-up coupling operation time may be set, for example, during manufacture of the intake control device 10. In addition, in the illustrated arrangement, before displacement at start-up begins, the movable intake pipes 30 are arranged between the coupled position Y and the separated position X by a processing of the shutdown separating processing unit 11g described below.

The start-up coupling operation unit 11a may decrease the output torque of the actuator 21 in the course of movement in the coupling direction to reduce a moving speed of the movable intake pipes 30. For example, until a predetermined time, which preferably is shorter than a start-up movement time, from the start of displacement, the actuator 21 may be driven at a predetermined duty ratio (referred herein to as high duty ratio, for example, 100%) and after the lapse of the predetermined time, the actuator 21 may be driven at a predetermined duty ratio, which preferably is lower than the high duty ratio.

After the processing of the start-up coupling operation unit 11a is terminated, the normal processing unit 11b performs a processing to drive the actuator 21 according to an operating state of a vehicle to vary an intake pipe length. The normal processing unit 11b functionally includes a coupled state maintaining unit 11c, a separating operation unit 11d, a separated state maintaining unit 11e, and a coupling operation unit 11f.

When the movable intake pipes 30 are stationary in the coupled position Y, the coupled state maintaining unit 11c drives the actuator 21 to energize the movable intake pipes 30 in the coupling direction. Specifically, when the processing by the start-up coupling operation unit 11a or the coupling operation unit 11f, described below, is terminated, the coupled state maintaining unit 11c intermittently drives the actuator 21 to energize the movable intake pipes 30 in the coupling direction. For example, after the actuator 21 is driven for a predetermined time (referred to herein as coupling direction energizing time), the coupled state maintaining unit 11c stops driving for a predetermined time (referred to herein as the stoppage time), which preferably is longer than the coupling direction energizing time, and thereafter repeats such driving and stoppage. At this time, the projections 22c of the upper levers 22 remain abutted against the column portions 41. Also, the spring 24b of the moving member 24 contracts so as to energize the movable intake pipes 30 downward (see FIG. 7(b)).

In addition, the coupled state maintaining unit 11c may drive the actuator 21 in a manner to output a smaller torque than that at the time of movement of the movable intake pipes 30 by the coupling operation unit 11f described below. That is, the coupled state maintaining unit 11c may make a duty ratio at the time of standstill of the movable intake pipes 30 lower than a duty ratio at the time of movement. Also, the actuator 21 may be fed at all times by the coupled state maintaining unit 11c at a lower duty ratio than that at the time of movement of the movable intake pipes 30 by the coupling operation unit 11f.

When an operating state meets a predetermined condition (referred below to as separating operation starting condition), the separating operation unit 11d drives the actuator 21 so that the movable intake pipes 30 present in the coupled position Y are moved to the separated position X. For example, in the case where an operating state meets a separation processing starting condition when the movable intake pipes 30 are in a coupled state, the separating operation unit 11d drives the actuator 21 for a preset time (referred to herein as the separating operation time) such that the movable intake pipes 30 are moved in the separation direction. Here, the separating operation time is the time required for movement of the movable intake pipes 30 to the separated position X from the coupled position Y. The separating operation time may be set, for example, during manufacture of the intake control device 10. Also, the separating operation starting condition is one in which an engine rotating speed remains above a preset speed (referred to herein as condition speed) and a throttle opening degree remains above a predetermined value (referred to herein as condition opening degree) continues for a predetermined time or longer.

Also, like the start-up coupling operation unit 11a, the separating operation unit 11d may decrease the output torque of the actuator 21 in the course of movement of the movable intake pipes 30 to decrease a moving speed of the movable intake pipes 30. That is, the separating operation unit 11d may drive the actuator 21 at a predetermined duty ratio (for example, 100%) for a predetermined time, which preferably is shorter than the separating operation time, and may drive the actuator 21 at a lower duty ratio than the predetermined duty ratio after the predetermined time lapses.

When the movable intake pipes 30 are stationary in the separated position X, the separated state maintaining unit 11e drives the actuator 21 so as to energize the movable intake pipes 30 in the separation direction. Specifically, when the movable intake pipes 30 reach the separated position X as a result of the processing by the separating operation unit 11d, the separated state maintaining unit 11e intermittently drives the actuator 21 to energize the movable intake pipes 30 in the separation direction. For example, after the actuator 21 is driven for a predetermined time (referred to herein as the separating direction energizing time), the separated state maintaining unit 11e stops driving for the stoppage time described above, and thereafter repeats such driving and stoppage. At this time, the separating direction energizing time may be shorter than the stoppage time. The actuator 21 energizes the movable intake pipes 30 whereby the projections 22d of the upper levers 22 abut against the column portions 41. Also, the spring 24b of the moving member 24 contracts so as to energize the movable intake pipes 30 upward (FIG. 7(a)).

In addition, the separated state maintaining unit 11e may drive the actuator 21 in a manner to output a smaller torque than that at the time of movement of the movable intake pipes 30 in the separation direction. That is, the separated state maintaining unit 11e may make a duty ratio at the time of standstill of the movable intake pipes 30 in the separated position X lower than a duty ratio at the time of movement. Also, the separated state maintaining unit 11c may supply the actuator 21 at all times with electric power, which is at a lower duty ratio than that at the time of movement.

When an operating state meets a predetermined condition (referred to herein as coupling operation starting condition), the coupling operation unit 11f drives the actuator 21 for a preset time (referred to herein as coupling operation time) so that the movable intake pipes 30 is moved in the direction of connection. Here, the coupling operation time is time required for movement of the movable intake pipes 30 to the coupled position Y from the separated position X. The coupling operation time may be set, for example, during manufacture of the intake control device 10. Also, the coupling operation starting condition is one in which an engine rotating speed becomes lower than the condition speed described above, or a throttle opening degree becomes smaller than the condition opening degree described above.

Similar to the separating operation unit 11d, the coupling operation unit 11f may decrease a moving speed of the movable intake pipes 30 in the course of movement thereof. That is, the coupling operation unit 11f may drive the actuator 21 at a predetermined duty ratio (for example, 100%) for a predetermined time, which preferably is shorter than the coupling operation time, and may drive the actuator 21 at a lower duty ratio than the predetermined duty ratio after the predetermined time lapses.

When an operation of the intake control device 10 is terminated (such as when the engine 50 of the motorcycle 1 is shutdown), the shutdown separating operation unit 11g drives the actuator 21 to displace the movable intake pipes 30 in the separation direction. Specifically, when the main switch 18 is moved to the OFF position, the shutdown separating operation unit 11g drives the actuator 21 for a preset period of time (referred to herein as shutdown separating operation time) so that the movable intake pipes 30 are moved in the separation direction. Here, the shutdown separating operation time is time required for movement of the movable intake pipes 30 to an intermediate position between the coupled position Y and the separated position X from the coupled position Y. Also, the shutdown separating operation time is shorter than the time during which electric power is supplied from the holding circuit 15 after the main switch 18 is moved to the OFF position. The shutdown separating operation time is set, for example, during manufacture of the intake control device 10. In this manner, when an operation of the intake control device 10 is terminated, the movable intake pipes 30 are arranged in the intermediate position whereby the sealing members 35 and the stationary intake pipes 40 are prevented from sticking to one another.

In addition, the shutdown separating operation unit 11g may drive the actuator 21 for the shutdown separating operation time with electric power, which is at the same duty ratio as that at the time of movement of the movable intake pipes 30 by the separating operation unit 11d, or may drive the actuator 21 with electric power, which is at a smaller duty ratio than that at the time of movement.

Figure 9:
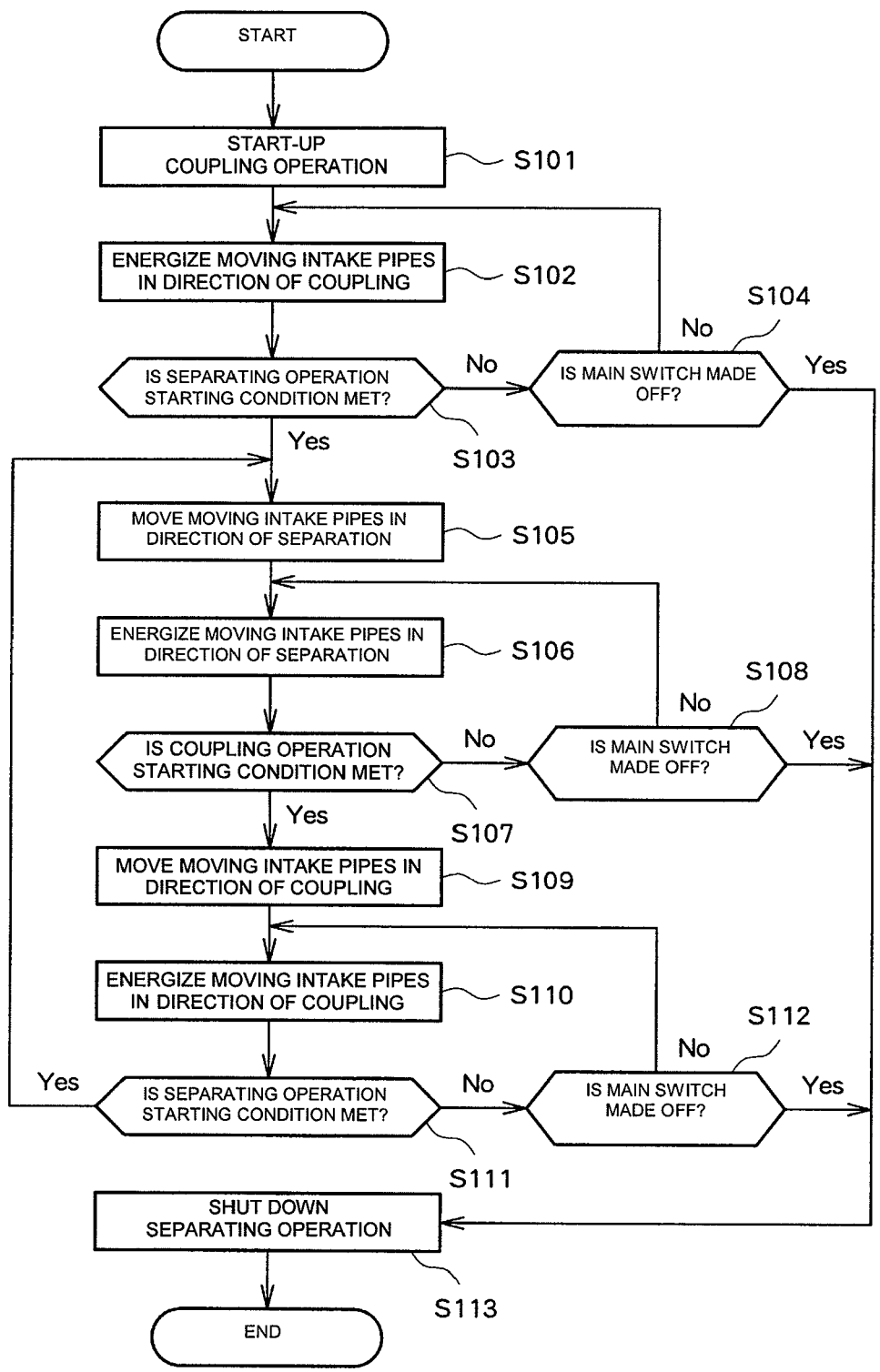
FIG. 9 is a flowchart of a preferred control process that may be executed by the control unit to control the movement of the movable intake pipes.

Below, a description of the processing executed by the control unit 11 is described. FIG. 9 is a flowchart illustrating an example of the control process executed by the control unit 11.

When the main switch 18 is moved to the ON position, the start-up coupling operation unit 11a drives the actuator 21 for the start-up coupling operation time (S101). Thereby, the movable intake pipes 30 are moved to the coupled position Y. In addition, before the movement, the movable intake pipes 30 are arranged in the intermediate position between the coupled position Y and the separated position X by the processing of the shutdown separating operation unit 11g during the previous operation.

When the start-up coupling operation time lapses, the coupled state maintaining unit 11c intermittently drives the actuator 21 to energize the movable intake pipes 30 in the coupling direction (S102). Also, the separating operation unit 11d detects the rotating speed of the engine 50 and a throttle opening degree to determine whether the separating operation starting condition has been met (S103). Here, when the separating operation starting condition is not met, the shutdown separating operation unit 11g determines whether the main switch 18 has been turned to the OFF position (S104), and in case of the main switch 18 not being moved to OFF, the processing returns to S102 and the coupled state maintaining unit 11c continues to energize the movable intake pipes 30.

On the other hand, in S103, in the case where the separating operation starting condition is met, the separating operation unit 11d moves the actuator 21 for the separating operation time (S105). Thereby, the movable intake pipes 30 are moved to the separated position X. When the separating operation time lapses, the separated state maintaining unit 11e intermittently drives the actuator 21 to begin energizing the movable intake pipes 30 in the separation direction (S108). Also, the coupling operation unit 11f detects an operating state to determine whether the coupling operation starting condition has been met (S107). Here, when the coupling operation starting condition is not met, the shutdown separating operation unit 11g determines whether the main switch 18 has been moved to OFF (S108). In the case where the main switch 18 has not been moved to OFF, the processing returns to S106 and the separated state maintaining unit 11e continues to energize the movable intake pipes 30 in the direction of separation.

On the other hand, in S107, when the coupling operation starting condition is met, the coupling operation unit 11f drives the actuator 21 for the coupling operation time (S109). Consequently, the movable intake pipes 30 are moved to the coupled position Y. When the coupling operation time lapses, the coupled state maintaining unit 11c intermittently drives the actuator 21 to energize the movable intake pipes 30 in the coupling direction (S110). Also, the separating operation unit 11d detects an operating state to determine whether the separating operation starting condition has been met (S111). Here, in the case where the separating operation starting condition is not met, whether the main switch 18 has been moved to OFF is determined (S112), and in case of not having been moved to OFF, the processing returns to S110, so that the coupled state maintaining unit 11c continues to energize the movable intake pipes 30 in the direction of connection.

On the other hand, in S111, when an operating state meets the separating operation starting condition, the processing returns to S1105 and the separating operation unit 11d drives the actuator 21 for the separating operation time so that the movable intake pipes 30 are moved in the separation direction.

In S104, S108, and S112, in the case where the main switch 18 is moved to OFF, the shutdown separating operation unit 11g drives the actuator 21 for the shutdown separating operation time to move the movable intake pipes 30 in the separation direction (S113). In addition, in S108, in the case where the main switch 18 is moved to OFF, the movable intake pipes 30 may be moved in the separation direction for the shutdown separating operation time in S113 after the movable intake pipes 30 initially in the separated position X are moved in the coupling direction for the coupling operation time. With such an arrangement, the movable intake pipes 30 are surely positioned in the intermediate position when an operation of the intake control device 10 is terminated.

With the intake control device 10 described above, when the movable intake pipes 30 are stationary in the coupled position Y or the separated position X, the actuator 21 drives the movable intake pipes 30 in the coupling direction or in the separation direction. Consequently, positional deviation of the movable intake pipes 30 is corrected and control of the movable intake pipes 30 is made simple without the provision of any potentiometer, which detects positions of the movable intake pipes 30.

In addition, the present invention is not limited to the intake control device 10 described above but is susceptible to various modifications. With the intake pipe length varying mechanism 14 described above, the movable intake pipes 30 translate in the same direction as a direction of intake in the stationary intake pipes 40. However, the movable intake pipes 30 may be turned in a circumferential direction to move between the coupled position and the separated position.

Also, in the case where the movable intake pipes 30 are present in the coupled position Y or the separated position X, time intervals at which the actuator 21 is driven may be determined on the basis of a traveling state of the vehicle. The actuator 21 is driven at the time intervals whereby the movable intake pipes 30 may be repeatedly energized intermittently, that is, at the time intervals in the coupling direction or in the separation direction. Here, a value indicative of a traveling state of the vehicle is, for example, an engine rotating speed and a throttle opening degree. Thereby, the frequency at which the actuator 21 is driven varies corresponding to those vibrations of a vehicle body, which increase or decrease according to a traveling state of the vehicle, so that the movable intake pipes 30 are stably maintained in the coupled position Y or the separated position X irrespective of an increase and a decrease in vibrations of a vehicle body. Subsequently, another intake control device having certain features, aspects and advantages of the present invention is described below. In addition, since the construction of the intake control device described below is the same as the intake control device 10 described above, a detailed explanation with respect to the construction of the intake control device is omitted. Also, a description of an example in which a crank angle sensor 57 is used as a sensor, which detects the degree of those vibrations of a vehicle body, increase or decrease according to a traveling state of the vehicle.

Figure 10:
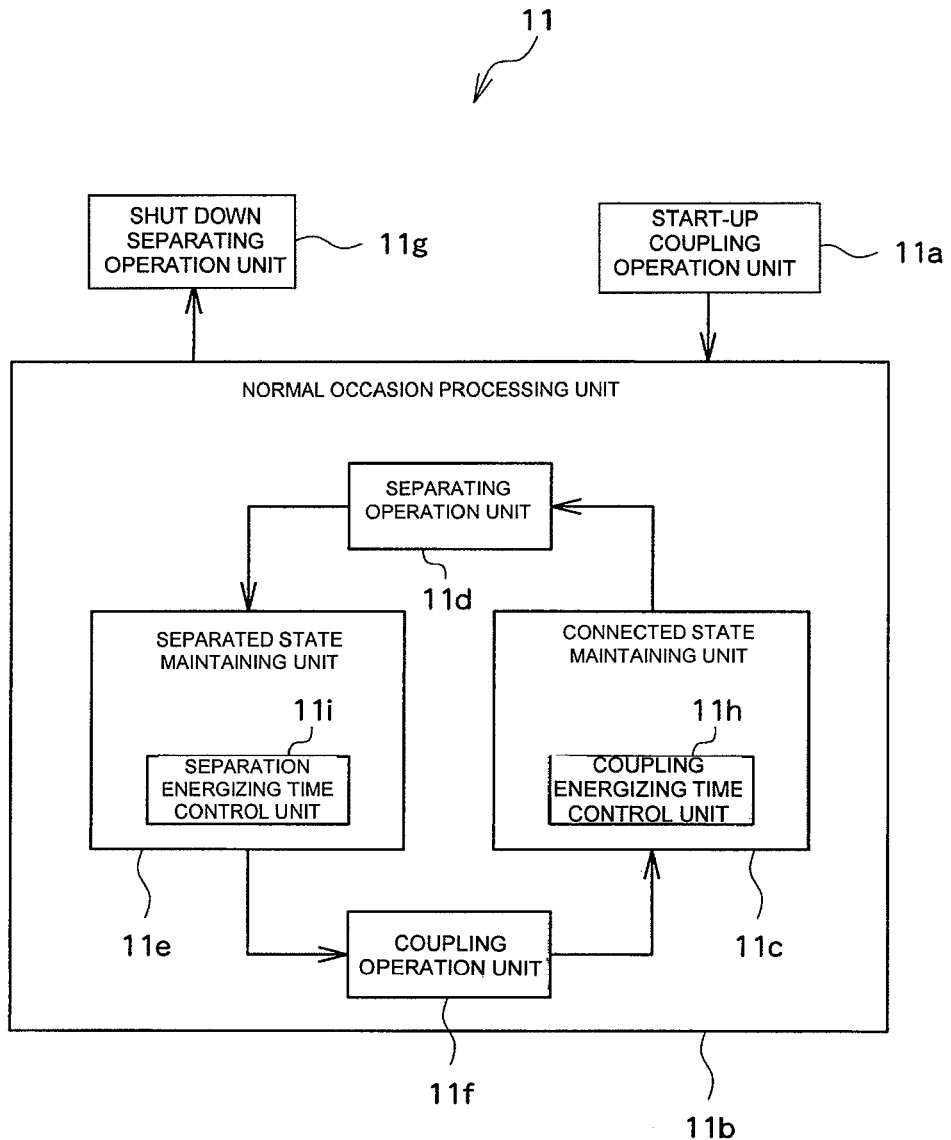
FIG. 10 is a block diagram illustrating another example of a preferred control process that may be executed by the control unit.

FIG. 10 is a functional block diagram illustrating a control process that may be executed by a control unit 11. As illustrated, a coupled state maintaining unit 11c includes a connection energizing time control unit 11h and a separated state maintaining unit 11e includes a separation energizing time control unit 11i.

When the movable intake pipes 30 are stationary in the coupled position Y, the connection energizing time control unit 11h detects an engine rotating speed on the basis of a signal input from the crank angle sensor 57 to determine a time interval at which the actuator 21 is driven based on the engine rotating speed. That is, stoppage time (referred to herein as connection energizing stoppage time) existing between a coupling direction energizing time, during which the actuator 21 is driven, and a subsequent coupling direction energizing time is determined. The processing by the connection energizing time control unit 11h is executed, for example, in the following manner.

A table (referred to herein as connection energizing control table), which illustrates a relationship between connection energizing stoppage time and an engine rotating speed, is stored in the memory of a storage unit 12. The connection energizing time control unit 11h detects an engine rotating speed in a predetermined sampling cycle to refer to the connection energizing control table every detection to acquire that connection energizing stoppage time, which corresponds to the engine rotating speed. FIG. 11 illustrates an example of the connection energizing control table stored in the storage unit 12. In this table, an upper row indicates an engine rotating speed, a lower row indicates connection energizing stoppage time, and the connection energizing stoppage time is shortened as an engine rotating speed increases.

In addition, the processing by the connection energizing time control unit 11h is not limited thereto. For example, connection energizing stoppage time may be calculated by substituting engine rotating speed, which is detected by the crank angle sensor 57, with an equation indicative of the relationship between an engine rotating speed and connection energizing stoppage time.

The coupled state maintaining unit 11c drives the actuator 21 for the coupling direction energizing time to energize the movable intake pipes 30, and then stops driving of the actuator 21 for the connection energizing stoppage time acquired by the connection energizing time control unit 11h. Thereafter, the actuator 21 is again driven for the coupling direction energizing time, and then driving of the actuator 21 is again stopped for the connection energizing stoppage time. In this manner, the coupled state maintaining unit 11c repeats such driving and stoppage of the actuator 21.

In the same manner as the processing of the connection energizing time control unit 11h, when the movable intake pipes 30 are stationary in the separated position X, the separation energizing time control unit 11i determines a time interval at which the actuator 21 is driven on the basis of an engine rotating speed detected by the crank angle sensor 57. That is, stoppage time (referred to herein as separation energizing stoppage time) existing between a separating direction energizing time, during which the actuator 21 is driven, and a subsequent separating direction energizing time is determined. For example, a table (referred to herein as separation energizing control table), which provides a relationship between separation energizing stoppage time and an engine rotating speed, is stored in the memory of the storage unit 12. The separation energizing time control unit 11i refers to the separation energizing control table to acquire that separation energizing stoppage time that corresponds to the engine rotating speed. FIG. 12 is a view illustrating an example of the separation energizing control table. In this table, an upper row indicates an engine rotating speed, a lower row indicates separation energizing stoppage time, and the separation energizing stoppage time becomes shorter as an engine rotating speed increases.

In addition, like the connection energizing time control unit 11h, the separation energizing time control unit 11i may substitute the engine rotating speed, which is detected by the crank angle sensor 57, into an equation indicative of the relationship between an engine rotating speed and separation energizing stoppage time to calculate separation energizing stoppage time.

The separated state maintaining unit 11e drives the actuator 21 for the separating direction energizing time to energize the movable intake pipes 30, and then stops driving of the actuator 21 for the separation energizing stoppage time acquired by the separation energizing time control unit 11i. Thereafter, the actuator 21 is again driven for the separating direction energizing time, and then driving of the actuator 21 is again stopped for the separation energizing stoppage time. In this manner, the separated state maintaining unit 11e repeats such driving and stoppage of the actuator 21.

In addition, a time during which the coupled state maintaining unit 11c drives the actuator 21 may be made longer than a time during which the separated state maintaining unit 11e drives the actuator 21. That is, connection energizing stoppage time may be shorter than separation energizing stoppage time. For example, as illustrated in the connection energizing control table in FIG. 11 and the separation energizing control table in FIG. 12, the respective connection energizing stoppage times may be set to be shorter than separation energizing stoppage time, which is caused to correspond to an engine rotating speed equal thereto. Thereby, positions of the movable intake pipes 30 in the coupled position Y are stably maintained as compared with the case where the movable intake pipes 30 are present in the separated position X. Consequently, in the case where the movable intake pipes 30 are present in the coupled position Y, clearances between the movable intake pipes 30 and the stationary intake pipes 40 are sealed.

Figure 13:
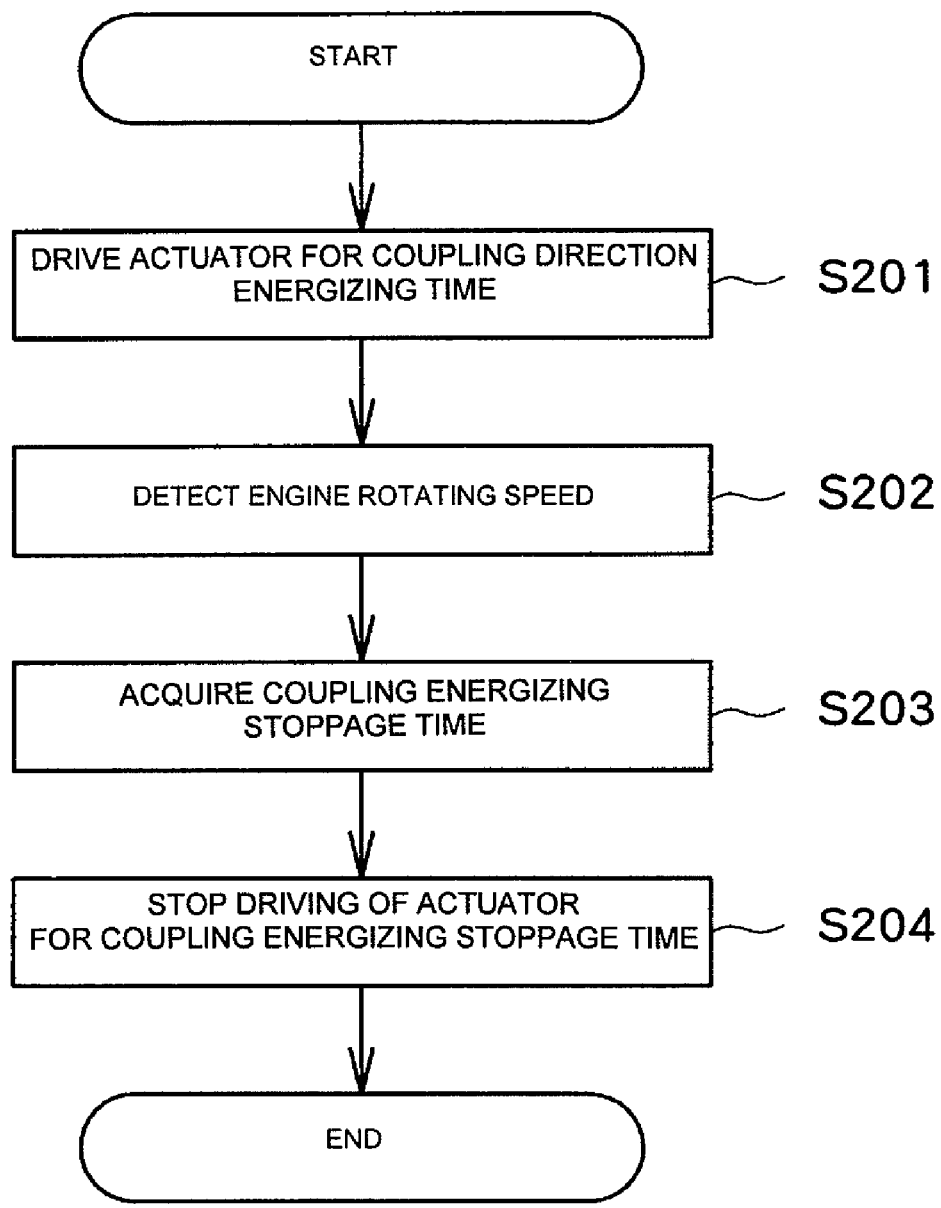
FIG. 13 is a flowchart of an example of a preferred control process that may be executed by a coupled state maintaining unit of the control unit.
Figure 14:
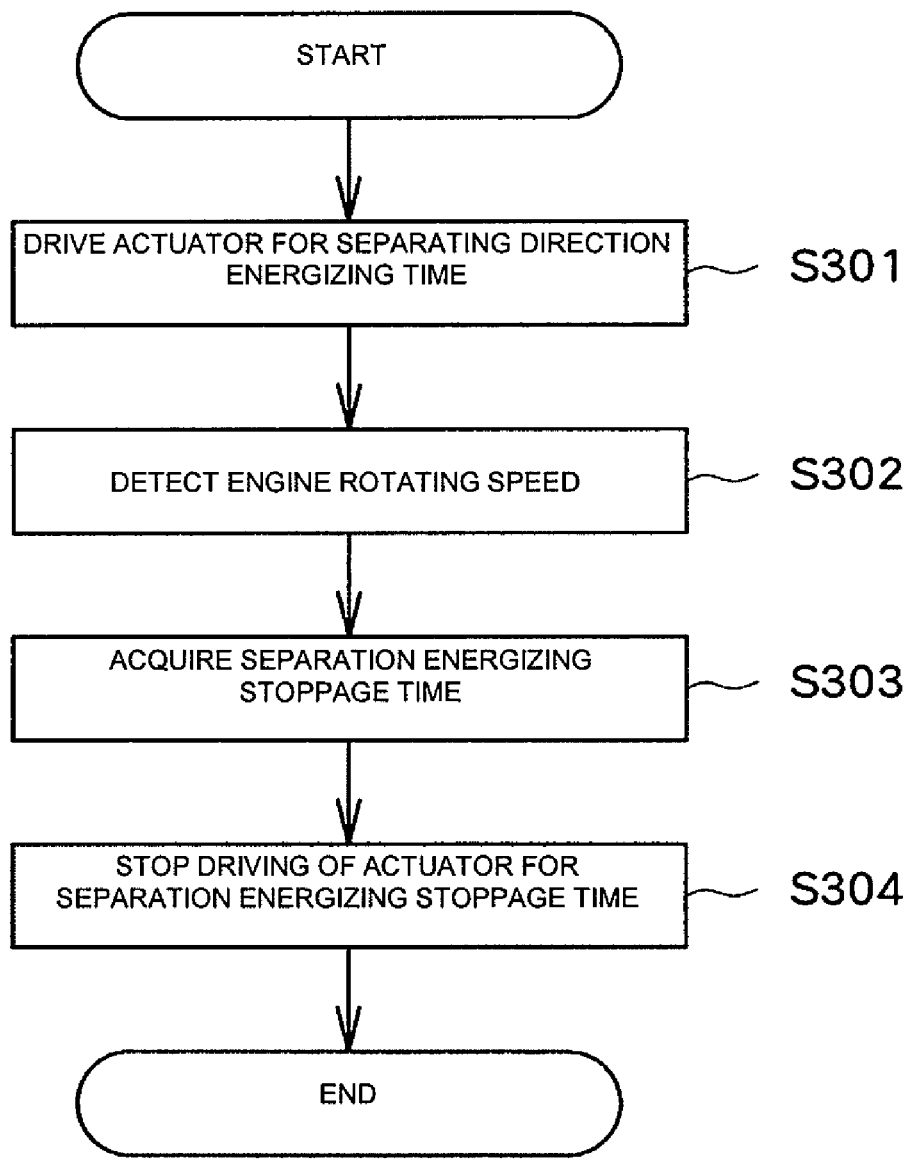
FIG. 14 is a flowchart of an example of a preferred control process that may be executed by a separated state maintaining unit of the control unit.

With reference to FIG. 13, a description is provided of a preferred control process flow executed by the coupled state maintaining unit 11c and the separated state maintaining unit 11e. FIG. 13 is a flowchart illustrating an example of the processing executed by the coupled state maintaining unit 11c and illustrates examples of control processes in S102 and S110 in the flowchart of FIG. 9. FIG. 14 is a flowchart illustrating an example of the processing executed by the separated state maintaining unit 11e and illustrates an example of processing in S106 in the flowchart of FIG. 9.

Initially, a description of the processing executed by the coupled state maintaining unit 11c is provided. The coupled state maintaining unit 11c drives the actuator 21 for the coupling direction energizing time to energize the movable intake pipes 30 in the coupling direction (S201). Also, the connection energizing time control unit 11h detects an engine rotating speed (S202) to refer to the connection energizing control table stored in the storage unit 12 to acquire that connection energizing stoppage time, which corresponds to the engine rotating speed (S203).

Thereafter, the coupled state maintaining unit 11c stops driving of the actuator 21 for the connection energizing stoppage time acquired by the connection energizing time control unit 11h (S204). The coupled state maintaining unit 11c repeats the above processing until the separating operation unit 11d determines that the separating operation starting condition is met.

Next, a processing of the separated state maintaining unit 11e is described. The separated state maintaining unit 11e drives the actuator 21 for the separating direction energizing time to energize the movable intake pipes 30 in the separation direction (S301). Also, the separation energizing time control unit 11i detects an engine rotating speed to refer to the separation energizing control table stored in the storage unit 12 (S302) to acquire that separation energizing stoppage time, which corresponds to the engine rotating speed (S303). Thereafter, the separated state maintaining unit 11e stops driving of the actuator 21 for the separation energizing stoppage time acquired by the separation energizing time control unit 11i (S304). The separated state maintaining unit 11e repeats the above processing until the coupling operation unit 11f determines that the coupling operation starting condition is met.

In addition, while it has been described that a relationship is given between an engine rotating speed and connection energizing stoppage time in the connection energizing control table, for example, coupling direction energizing time may be caused to correspond to an engine rotating speed. In this case, it may be set so that the higher an engine rotating speed, the longer coupling direction energizing time, and the coupling direction energizing time may be constant. Likewise, it may be set in the connection and separation energizing control tables so that separating direction energizing time is caused to correspond to an engine rotating speed and the higher an engine rotating speed, the longer separating direction energizing time.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present intake control system has been described in the context of particularly preferred embodiments, the skilled artisan will appreciate, in view of the present disclosure, that certain advantages, features and aspects of the system may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. An intake air control device for an engine, comprising:
   a stationary intake pipe at least partially defining an intake passage that communicates with an intake port of the engine;
   a movable intake pipe that is movable relative to the stationary intake pipe to vary a length of the intake passage;
   an actuator that is capable of moving the movable intake pipe; and
   a controller that controls the actuator;
   wherein, in a first operational state, the movable intake pipe is moved to a first position relative to the stationary intake pipe and is inhibited from moving beyond the first position, and wherein the controller directs the actuator to apply a force tending to move the movable intake pipe in the first direction when the movable intake pipe is in the first operational state.

2. The control device of claim 1, wherein the first position is a coupled position in which the movable intake pipe is coupled to the stationary intake pipe such that both the movable intake pipe and the stationary intake pipe define a portion of the intake passage.

3. The control device of claim 2, further comprising a stop that inhibits the movable intake pipe from moving beyond the coupled position.

4. The control device of claim 1, wherein the first position is a separated position in which the movable intake pipe is separated from the stationary intake pipe.

5. The control device of claim 4, further comprising a stop that inhibits the movable intake pipe from moving beyond the separated position.

6. The control device of claim 1, wherein the force applied to the movable intake pipe by the actuator when the movable intake pipe is moving toward the first position is of a first magnitude and the force applied to the movable intake pipe by the actuator when the movable intake pipe is in the first position is of a second magnitude, which is smaller than the first magnitude.

7. The control device of claim 1, wherein the force applied to the movable intake pipe by the actuator when the movable intake pipe is in the first position is intermittently applied.

8. The control device of claim 7, further comprising a vehicle condition sensor that detects an operating condition of a vehicle associated with the control device, wherein the controller directs the actuator to apply the force to the movable intake pipe at a time interval that is dependent on the operating condition of the vehicle.

9. The control device of claim 8, wherein the vehicle condition sensor is an engine speed sensor and the operating condition is a rotational speed of the engine.

10. The control device of claim 8, wherein the movable intake pipe is movable in a coupling direction towards the stationary intake pipe, and the movable intake pipe is movable in a separation direction away from the stationary intake pipe, and the controller directs the actuator to move the movable intake pipe in the separation direction when an operation of the control device is terminated.

11. The control device of claim 1, wherein the movable intake pipe is movable in a coupling direction towards the stationary intake pipe, and the movable intake pipe is movable in a separation direction away from the stationary intake pipe, and the controller directs the actuator to move the movable intake pipe in the separation direction when an operation of the control device is terminated.

12. The control device of claim 1, wherein the control device is incorporated in a straddle-type vehicle.

13. A method of controlling an intake air device for an engine, comprising:
   moving a movable intake pipe relative to a stationary intake pipe in a first direction;
   using a stop to inhibit further movement of the movable intake pipe in the first direction beyond a stop position; and
   applying a force to the movable intake pipe that tends to move the movable intake pipe in the first direction for a period of time after the movable intake pipe has been moved to the stop position.

14. The method of claim 13, wherein the force is applied intermittently to the movable intake pipe after the movable intake pipe is in the stop position.

15. The method of claim 13, wherein a magnitude of the force applied to the movable intake pipe after the movable intake pipe is in the stop position is less than a magnitude of the force applied to the movable intake pipe to move the movable intake pipe towards the stop position.

16. The method of claim 13, wherein the stop position is a coupled position in which the movable intake pipe is coupled to the stationary intake pipe such that the movable intake pipe and the stationary intake pipe cooperate to define an air intake passage.

17. The method of claim 13, wherein the stop position is a separated position in which the movable intake pipe is separated from the stationary intake pipe.

18. The method of claim 13, wherein the period of time for which the force is applied to the movable intake pipe after the movable intake pipe is in the stop position is dependent upon an operating condition of a vehicle associated with the intake air device.

19. The method of claim 13, wherein the operating condition is an engine rotational speed of the vehicle.

* * * * *